July 10, 1945.  P. C. KEITH ET AL  2,380,245
APPARATUS FOR EFFECTING CATALYTIC REACTIONS
Filed Jan. 31, 1941

PERCIVAL C. KEITH.
MYRLE M. PERKINS.
INVENTORS
BY
ATTORNEYS

Patented July 10, 1945

2,380,245

UNITED STATES PATENT OFFICE 2,380,245

APPARATUS FOR EFFECTING CATALYTIC REACTIONS

Percival C. Keith, Peapack, N. J., and Myrle M. Perkins, Brooklyn, N. Y., assignors to The M. W. Kellogg Company, Jersey City, N. J., a corporation of Delaware Application January 31, 1941, Serial No. 376,804

2 Claims. (Cl. 23—285)

This invention relates to an apparatus for carrying out liquid phase reactions with a liquid catalyst which is immiscible with the reactants. More particularly, the invention relates to an apparatus for carrying out liquid phase reactions of hydrocarbons which are promoted by the presence of an acid catalyst which is immiscible with the hydrocarbons reacted and the reaction products. Still more particularly, the invention relates to an apparatus for carrying out liquid phase alkylation of hydrocarbons in the presence of an acid catalyst such as sulfuric acid.

In carrying out liquid phase reactions in the presence of a liquid catalyst which is immiscible with the reactants it is necessary to secure intimate mixing of the catalyst and the reactants as an emulsion in which either the reactants or the catalyst constitute the continuous phase. In the alkylation of hydrocarbons, which will be referred to as illustrative of the reactions to which the present invention is applicable, it is necessary to effect intimate mixing of the hydrocarbon reactants and the acid catalyst, such as sulfuric acid, to obtain the benefits of the catalytic action of the sulfuric acid. For example, in the alkylation of isobutane with butenes or propylene with sulfuric acid the reactants and the acid are intimately mixed to form an emulsion. Ordinarily, the hydrocarbons are dispersed in the acid in such a manner that the acid is a continuous phase and the hydrocarbons a discontinuous phase. Such a process is operated ordinarily by maintaining a body of the emulsion, continuously introducing into the body of the emulsion additional supplies of hydrocarbon reactants and acid catalyst, and continuously withdrawing a portion of the emulsion to be separated into a hydrocarbon layer and an acid layer.

The heat of the alkylation reaction may be abstracted from the body of emulsion in the reaction zone by indirect heat exchange of the body of emulsion with external refrigerating means. Preferably, however, internal refrigeration is effected by permitting continuous evaporation of unreacted hydrocarbons which are withdrawn from the reaction zone, condensed, and returned for further treatment.

We have found that in the alkylation of isobutane with olefinic hydrocarbons in the presence of sulfuric acid apparently olefinic hydrocarbons are absorbed by the sulfuric acid while the saturated hydrocarbons present, including the isoparaffins, remain in a separate phase as droplets. Alkylating reactions, therefore, apparently take place at the surface of the droplets forming the discontinuous phase of the emulsion. Concurrently with the alkylation reactions there is a condensation reaction of the olefins in the sulfuric acid which may be termed "hydropolymerization." The condensation products of this reaction accumulate in the acid phase of the emulsion and impair the catalytic activity of the acid. This requires periodic or continuous removal of a portion of the acid used in the process, and its replacement with fresh acid.

It is an object of the invention to provide an apparatus for effecting intimate mixing of liquid reactants and liquid catalyst immiscible therewith. It is a further object of the invention to provide an apparatus for effecting liquid phase alkylation of paraffinic hydrocarbons with olefinic hydrocarbons in the presence of an acid catalyst wherein rapid and intimate mixing of the reactants and the acid are effected in order to restrict the volume of the body of emulsion which it is necessary to maintain and in order to minimize the formation of olefin condensation products in the acid. It is a further object of the invention to provide an apparatus for the alkylation of paraffinic hydrocarbons with olefinic hydrocarbons in the presence of an acid catalyst wherein the portion of the reaction mixture which has the largest proportion of olefinic reactants is subjected to intimate mixing and that portion of the reaction mixture in which exothermic heat of reaction is developed to the greatest degree is subjected to cooling.

The invention will be described in detail by a reference to the accompanying drawing which illustrates the process by reference to an embodiment of the apparatus of the invention. It is to be understood, however, that the invention is not limited by reference to the specific modification illustrated by the drawing but is capable of other modifications within the scope of the invention, as will be apparent to those skilled in the art.

In the drawing

Figure 1:
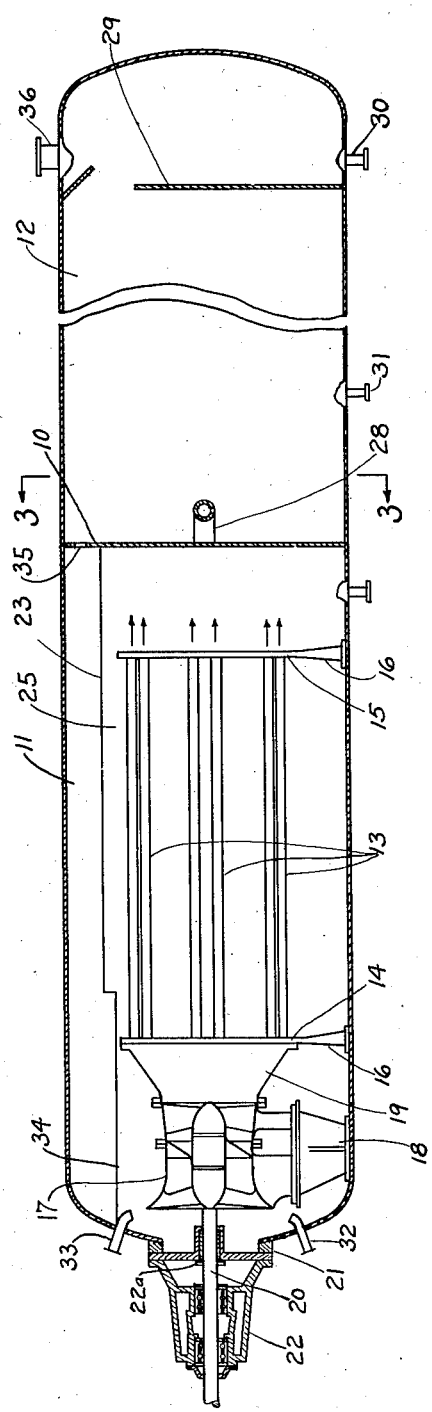
Figure 1 represents an elevation in cross section of a horizontal reactor for effecting alkylation of isobutane with butenes or propylene.
Figure 3:
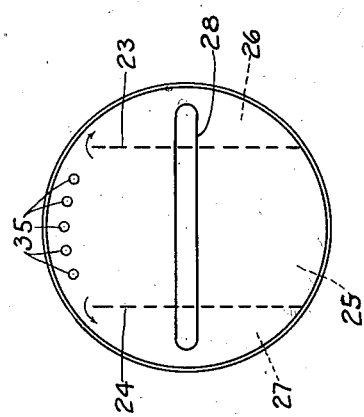
Figure 3 is an end view of the reactor in cross section at 3—3.

Referring to Figure 1, the reactor is divided by means of partition 10 into a reaction chamber 11 and a separating chamber 12. Conveniently, chamber 11 and chamber 12 may be approximately equal in volume, but this ratio is subject to wide variation. It will be noted that reaction chamber 11 and settling chamber 12 are relatively elongated horizontally but obviously the position and shape of these chambers may be varied. For example, chambers which are elongated vertically may be used.

Figure 2:
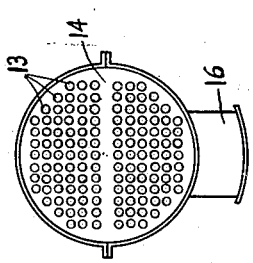
Figure 2 is an end view of the mixing and circulating means located in the horizontal reactor.

In reaction chamber 11 there is located a mixing and circulating means comprising a plurality of parallel tubes 13 suitably mounted in a horizontal position by means of tube sheets 14 and 15. Tube sheets 14 and 15 are suitably supported by foundation means 16. Fig. 2 is a view in elevation of the outer surface of tube sheet 14, showing the ends of tubes 13, and foundation 16.

Within reaction chamber 11 there is provided also a suitable impeller, such as a pump 17, suitably supported by foundation means 18. Pump 17 is mounted with respect to tubes 13 to promote circulation of fluids therethrough. Suitably, pump 17 is mounted in a position to impel fluids horizontally toward the tube sheet 14. To assist in guiding fluids impelled by pump 17 to the entrances of the tubes 13 at tube sheet 14 the latter may be connected to the exit of pump 17 by funnel means 19.

A shaft 20 for actuating pump 17 extends from pump 17 horizontally through an opening 21 in the end of the reactor. Shaft 20 is mounted in bearing 22 and a suitable stuffing box 22a is provided to prevent leakage of fluids from the reaction chamber 11 around shaft 21. Suitable rotating means (not shown), such as an electric motor or a steam turbine, may be attached to shaft 21 to provide necessary rotation.

The reaction chamber 11 is divided longitudinally into three portions by means of longitudinal partitions 23 and 24 which provide a central reaction zone 25 in which tubes 13 and pump 17 are located. Partitions 23 and 24 also form, with the side walls of the reactor, and partition 10, collectors 26 and 27 which are provided for the collection of emulsion to be withdrawn from the reaction zone 25.

The longitudinal partitions 23 and 24 may form overflow weirs whereby the emulsion to be withdrawn from the reaction chamber flows into collectors 26 and 27. Preferably, the weir sections of the partitions 23 and 24 are restricted, as shown, to the portions farthest from the exit of tubes 13 whereby all of the emulsion withdrawn has passed at least once through the tubes 13 and in the reverse direction around the outside of the tubes.

The emulsion collected in collectors 26 and 27 is withdrawn therefrom through a distributing pipe 28 which is located in settling chamber 12 and connects with collectors 26 and 27 by means of suitable openings in partition 10. Emulsion from collectors 26 and 27 flows into settling chamber 12 by means of a suitable opening in pipe 28, such as a slot along the bottom thereof which assists in distributing the mixture in chamber 12.

In settling chamber 12 the emulsion separates into an upper layer of hydrocarbons, including reactants and reaction products, and a lower layer of acid. Hydrocarbons flow over a partition 29 extending across settling chamber 12 near an end thereof. The hydrocarbons thus collected in the space between partition 29 and the end of settling chamber 12 are withdrawn therefrom through a suitable opening at 30. The acid collected as a lower layer in the main part of settling chamber 12 is withdrawn directly therefrom through a suitable opening at 31.

A mixture of hydrocarbon reactants such as a mixture of isobutane and butenes is introduced continuously into reaction zone 25 through suitable inlet means 32. A corresponding quantity of acid catalyst is introduced, preferably separately, through suitable inlet means at 33. Preferably the inlet means 32 and 33 are placed adjacent the inlet to pump 17 whereby the fresh reactants and acid, mixed with recirculated emulsion, are immediately forced through tubes 13, in the circulation of the materials in reaction zone 25.

The operation of the reactor will be described by reference to a process of alkylating isobutane with butenes. It is to be understood, however, that the process and apparatus of the invention are applicable also to other reactions involving the use of liquid reactants and liquid catalyst immiscible with the reactants.

The mixture of isobutane and butenes, which may include normal butane and a small proportion of propane, is introduced to reaction chamber 11 at 32. Sulfuric acid catalyst, which may include acid recycled from outlet 31 and fresh acid, is introduced into reaction chamber 11 at 33. In starting the process the reaction zone 25 is substantially filled with isobutane in the liquid phase. Pump 17 is operated whereby the liquids contained in reaction zone 25 circulate in series from the space adjacent inlets 32 and 33 through pump 17 and tubes 13 and back around tubes 13 and pump 17 to the entrance of pump 17.

The acid introduced at 33 is immediately mixed with isobutane, and the resulting mixture is drawn into pump 17. The isobutane and butenes introduced at 32 are immediately mixed with additional isobutane, and the resulting mixture is drawn substantially immediately into pump 17. In pump 17 the isobutane, butene and acid catalyst are mixed preliminarily and during the passage of this mixture through tubes 13. Mixing of the reactants and the catalyst is intimate and continuous because of the constant shearing of the droplets of the discontinuous phase of the mixture by the flow of the mixture over and adjacent the surfaces of the tubes. By the shearing effect thus obtained the hydrocarbon droplets are continuously subdivided whereby they present a large surface area. This facilitates the reaction which occurs at the interface of the two phases of the emulsion. This method of mixing also results in frequent replacement of the layers of acid immediately adjacent the hydrocarbon droplets. Continuous subdivision of the hydrocarbon droplets and replacement of acid layers adjacent the droplets promotes completion of the alkylation reaction and disappearance of the olefin hydrocarbons in a relatively short period of time whereby the condensation, or "hydro-polymerization," of olefins is minimized.

While the conduits 13 are shown as cylindrical tubes these may be varied in size and shape, in accordance with the velocity with which it is desired to flow the reaction mixture through the tubes, to produce the kind of flow desired. It is believed that the greatest shearing effect with resulting promotion of the alkylation reaction is obtained by flowing the reactants through the conduits 13 at a velocity and under conditions wherein the ratio of the internal surface of the conduits 13 to the internal volume of the conduits produces stream flow of the liquid reaction mixture therethrough. However, it may be found desirable to produce turbulent flow of the materials through conduits 13, and this type of flow of the liquids may be obtained by suitable regulation of the ratio of the internal surface area of the conduits 13 to the volume of the conduits, in relation to the velocity of the fluids passing through conduits 13.

The use of a plurality of conduits in accordance with the present invention to promote mixing of the reactants and the catalyst permits the use of apparatus which is extremely adaptable to varying conditions of operation. For example, in the use of a plurality of cylindrical tubes, as shown in the drawing, as conduits the ratio of internal surface area of the tubes to the internal volume of the tubes can be varied conveniently by the provision in each tube of a concentric rod. By the provision of such rods of varying diameter it is possible to adapt the apparatus easily to changing conditions of operation.

Alternatively, instead of the use of cylindrical tubes as the conduits 13 the latter may take the form of elongated cases in which the cross-sectional shape is varied to produce the desired ratio of internal surface area to internal volume. The invention, however, is not limited to the use of conduits which are not circular or rectangular in cross section, as it will be apparent that conduits of other shapes may be used without departing from the scope of the invention.

In the operation of the process of the invention the reaction mixture is forced through the conduits 13 in the elongated paths of restricted cross-sectional area, which are provided by the conduits 13, at a velocity which is substantially higher than the velocity of movement of the liquids in that part of reaction zone 25 external to the conduits 13. The reaction mixture, therefore, is under a higher pressure in the conduits 13 than elsewhere in the reaction zone 25. This difference in pressure is at a maximum at the exit of pump 17 and decreases as the materials proceed through conduits 13 from the entrances thereof to the exits. Inasmuch as the reaction mixture at the exit of the pump 17 contains the highest concentration of olefins in the entire reaction mixture contained in reaction zone 25, it will be apparent that the alkylation reaction is more intense at that point because of the concentration of reactants and because of the relatively high pressure.

Because of the intensity of the reaction in the materials traversing the conduits 13 near the entrances thereof the temperature of that portion of the reaction mixture tends to rise because of the heat developed by the exothermic reaction. There is, however, a rapid dissipation of such heat, whereby the temperature increase is minimized, because of two counterbalancing effects. One of these effects is the constant decrease in pressure on the reactants as they proceed through conduits 13 which facilitates evaporation of low-boiling hydrocarbon constituents. This results in rapid dissipation of exothermic heat of the reaction. The other counterbalancing effect results from indirect heat exchange between the materials undergoing reaction during their passage through the conduits 13 and the portion of the reaction mixture in contact with the external surfaces of conduits 13. This material consists of hydrocarbons and acid catalyst which have passed through conduits 13 and are maintained at a low temperature by evaporation of low-boiling hydrocarbons. Heat exchange is efficient because of evaporation occurring at the surface of the conduits.

The present invention, therefore, provides means for effecting the alkylation reaction under conditions which promote rapid reaction, and consumption of the olefins present, while permitting rapid dissipation of the heat developed by the exothermic alkylation reaction.

As the mixture of hydrocarbon reactants, hydrocarbon products, and acid catalyst emerges from the conduits 13 at the exits thereof, adjacent the partition 10, the velocity thereof is considerably reduced and the direction of flow is reversed whereby the mixture travels away from partition 10 in the direction of the entrance of pump 17. In the preferred embodiment of the invention this material is permitted to pass over and around the conduits 13 without further agitation and without withdrawal of any portion of the mixture. This method of operation is provided in the apparatus by maintaining that portion of the longitudinal partitions 23 and 24 which extend along the length of the conduits 13 sufficiently high to prevent overflow of the mixture into collectors 26 and 27.

Continuous removal of a portion of the reaction mixture, to counterbalance the material introduced at 32 and 33, is effected by maintaining those portions of the longitudinal partitions 23 and 24 which are adjacent pump 17 sufficiently low to form overflow weirs 34 which permit liquids from reaction zone 25 to overflow into collectors 26 and 27. The removal of liquids from the reaction zone 25 in this manner provides sufficient time for effecting substantially complete reaction of the remaining olefinic hydrocarbons in the mixture as the reaction mixture traverses the length of the reaction zone 25 from points adjacent partition 10 to the overflow weirs 34.

The alkylation reactor is maintained preferably at conditions of temperature and pressure which permit continuous evaporation of low-boiling hydrocarbons which are present. This effects continuous removal from the reaction zone of heat developed by the alkylation reaction and prevents a substantial rise in temperature of the reaction mixture. In the alkylation of isobutane with butenes the charge material ordinarily contains substantial quantities of normal butane as impurities. A substantial proportion of propane also may be present. Inasmuch as these hydrocarbons, together with the isobutane present, constitute the lowest boiling constituents in those portions of the reaction mixture which are heated by the exothermic reaction, the method of refrigerating the reaction mixture by evaporation results in the separation from the reaction mixture in the reaction zone 25 of a hydrocarbon mixture consisting of isobutane, normal butane and propane in proportions depending upon the relative proportions of these materials present in the reaction zone. The quantity of propane maintained in the reaction zone may be regulated by suitable control of propane content of the fresh feed or the hydrocarbons recycled to the reaction zone to provide the degree of evaporation in the reaction zone necessary to abstract the heat of reaction at the conditions of temperature and pressure at which it is desired to conduct the reaction.

In the reactor illustrated in the drawing the removal of hydrocarbons thus vaporized from reaction chamber 11 is provided for by any suitable means. For example, openings 35 may be provided in the upper portion of partition 10 whereby the vapors pass from reaction chamber 11 into separating chamber 12. At the end of separating chamber 12 suitable means are provided at 36 for removal of the vapors from the reactor. The vapors withdrawn at 36 are condensed externally of the reactor, and condensate obtained therefrom is recycled to the reaction zone at 32.

This method of cooling the reaction mixture is advantageous because of the efficient cooling thus provided and also because, through the condensation and return of these hydrocarbons, it affords selective recycling of isobutane to the reaction zone. In view of the fact that isobutane is lower boiling than normal butane the ratio of isobutane to normal butane in the vapors withdrawn at 36 is substantially higher than the ratio of these materials in the hydrocarbon mixture withdrawn at 32. Condensation of the vapors withdrawn at 36 thus provides for recycling to the reaction zone of a hydrocarbon mixture relatively rich in isobutane. The hydrocarbon mixture withdrawn at 30 is fractionated in accordance with the usual method of operation to separate a fraction predominating in isobutane for recycling to the reaction zone at 32. The preliminary fractionation afforded by evaporation of the light hydrocarbons in the method described thus provides, in addition to the refrigeration effect desired, recycling of isobutane to the reaction zone to maintain the high ratio of isobutane to olefins desired therein. This method also reduces the capacity necessary in the means required for fractionation of the hydrocarbons withdrawn at 30.

As the reaction mixture traverses the reaction zone from points adjacent partition 10 to the overflow weirs 34 the reduced velocity of flow of the mixture and the resulting decrease in agitation facilitates the natural tendency of the hydrocarbon droplets to rise toward the upper surface of the mixture. This tendency is promoted by the above-described methods of cooling the reaction mixture by evaporation of low-boiling hydrocarbons. Such evaporation necessarily takes place in and at the surface of the hydrocarbon droplets. The resulting lightening of the droplets by this means and the upward movement of bubbles of hydrocarbon vapors which have separated from droplets of hydrocarbon liquid accelerate the movement of hydrocarbon droplets toward the upper surface of the reaction mixture. Consequently, as the reaction mixture traverses reaction zone 25 to approach the overflow weirs 34 there is a substantial separation of the hydrocarbon content of the emulsion whereby that portion of the reaction mixture adjacent the overflow weirs 34 is relatively concentrated in hydrocarbons. This effect depends upon the velocity of flow of the materials in the reaction zone but, by suitable regulation of the velocity of flow and the length of the reaction zone 25, it is possible to effect the formation of a hydrocarbon layer at that portion of the upper surface of the reaction mixture which is adjacent overflow weirs 34. In any case, this method of operation permits the withdrawal from reaction zone 25 of materials which are relatively concentrated in hydrocarbons and may contain only a small amount of acid. This condition may be regulated to limit the content of acid in the material overflowing weirs 34 to effect withdrawal from reaction zone 25 of acid only to the extent to which it is desired to withdraw acid from the reaction zone in any case for replacement therewith fresh acid.

The method and apparatus thus provides for intimate mixing of the reactants at the point of maximum concentration of olefins, effective cooling of that portion of the reaction mixture in which the alkylation reaction is proceeding with the greatest intensity, the application of pressure to that portion of the reaction mixture containing the maximum concentration of olefins, withdrawal of material from the reaction zone which is relatively concentrated in hydrocarbons, and retention of acid in the reaction zone whereby the most efficient use of the catalyst is obtained.

The method of withdrawal of material from collectors 26 and 27 for introduction into the settling chamber 12 which is afforded by the present apparatus permits equalization of any difference in the liquid levels in collectors 26 and 27 which may result from surges in reaction zone 25 and provides for introduction of the material into settling chamber 12 across the width thereof at relatively low velocity. The connections of pipe 28 with partition 10 may be placed at any level desired to provide for satisfactory removal of liquids from collectors 26 and 27, and pipe 28 may extend to any desired level in the settling chamber 12 to provide for introduction of the liquids withdrawn from collectors 26 and 27 into chamber 12 at any desired level. Furthermore, a plurality of members such as pipe 28 may be provided. For example, it may be desired to provide a separate member similar to pipe 28 suitably connected with partition 10 at points adjacent the lowest parts of collectors 26 and 27 to prevent acculation of acid therein.

In the apparatus illustrated in the drawing as an embodiment of the invention the conduits 13 are shown in a horizontal position. It is apparent, however, that the mixing effect of this apparatus may be obtained by means of similar conduits placed in any position in the reaction zone 25 from horizontal to vertical. It is necessary only that means be provided for moving the reaction mixture through such conduits from one position to another within the reaction zone.

The improved apparatus of the present invention may be constructed of any suitable material which is not impaired by contact with the reaction mixture. For conducting alkylation reactions as described steel is a satisfactory material of construction because of its strength and because it is not attacked by acid of the concentration required by the reaction. Ordinarily, in the alkylation of isobutane with butenes sulfuric acid having a concentration of at least 85 per cent is used. The reactor may be maintained under approximately atmospheric pressure, and a reaction temperature of 35 to 70° F. may be employed.

We claim:

1. Apparatus for effecting liquid phase catalytic hydrocarbon reactions in the presence of a liquid catalyst heavier than and immiscible with at least a substantial proportion of said hydrocarbon reactants which comprises a horizontally elongated reaction chamber having elongated side walls and short end walls, partitions extending along the elongated side walls of said chamber and arranged to provide with the walls of said chamber a vessel for containing a body of liquid comprising a mixture of said hydrocarbon reactants and liquid catalyst and arranged with respect to said elongated side walls of said chamber to provide collecting troughs adapted to receive overflow of liquids from said vessel, said partitions having relatively low upper edges near one end of said chamber whereby overflow of liquid from said vessel into said collectors is concentrated at that end of said chamber, a plurality of substantially parallel elongated tubes extending between points adjacent the ends of said chamber, said tubes being located in said chamber in a position to be submerged in said body of liquid in said vessel, impelling means positioned within said vessel at an end thereof to contact said body of liquid and located with respect to said tubes to cause flow of liquids in said body into said tubes at the ends thereof adjacent the low edges of said partitions, and means for continuously introducing fresh reactants into said vessel at the end thereof adjacent the said low edges of said partitions.

2. Apparatus in accordance with claim 1 comprising in addition a settling chamber external of said reaction chamber and means to convey liquids from said collecting troughs to said settling chamber.

PERCIVAL C. KEITH.
MYRLE M. PERKINS.